(12) United States Patent
Tatsuno

(10) Patent No.: US 6,979,811 B2
(45) Date of Patent: Dec. 27, 2005

(54) LIGHT SENSING FILM AND LIGHT SENSOR CIRCUIT USING THE SAME

(75) Inventor: Isao Tatsuno, 1-792-12, Naka-Arai, Tokorozawa-shi, Saitama-Pref., 359-0041 (JP)

(73) Assignee: Isao Tatsuno, Tokorozawa (JP)

( * ) Notice: Subject to any disclaimer, the term of this patent is extended or adjusted under 35 U.S.C. 154(b) by 372 days.

(21) Appl. No.: 10/387,519

(22) Filed: Mar. 14, 2003

(65) Prior Publication Data

US 2003/0189162 A1  Oct. 9, 2003

(30) Foreign Application Priority Data

Apr. 4, 2002 (JP) .............................. 2002-102926

(51) Int. Cl.[7] ............................................. H01L 31/00
(52) U.S. Cl. .............................. 250/214.1; 250/214 AL
(58) Field of Search ...................... 250/214.1, 214 AL, 250/214 R; 315/155, 156, 157; 257/21, 53; 359/271, 282

(56) References Cited

U.S. PATENT DOCUMENTS 3,963,488 A * 6/1976 Brushenko .................. 430/54

* cited by examiner

Primary Examiner—Que T. Le
(74) Attorney, Agent, or Firm—Oliff & Berridge PLC

(57) ABSTRACT

A light sensing film formed by laminating together a transparent/translucent material, an upper transparent electrode, a photosensitive dielectric layer including photosensitive dielectric material, and a lower electrode formed from conductive material such as carbon, a silver coating, a metallic plate, or a conductive coating. A capacitor is composed between the two electrodes. As the dielectric constant of the photosensitive dielectric layer between the two electrodes changes when light enters, capacitance of the capacitor changes, and light intensity can be detected. To regulate capacitance, an additional dielectric layer may be provided between the photosensitive dielectric layer and the lower electrode. The underside of the electrode may be laminated with protective material.

10 Claims, 2 Drawing Sheets

VERTICAL SECTION OF THE FILM LAYERS

VERTICAL SECTION OF THE FILM LAYERS

VERTICAL SECTION OF THE FILM LAYERS

LIGHT SENSING FILM AND LIGHT SENSOR CIRCUIT USING THE SAME

TECHNICAL FIELD

A light sensing film and a light sensing circuit using the same of the present invention are used to measure light intensity. In addition to commercial uses such as a sunburn alarm, which measures the intensity of ultraviolet rays and notifies the user of the degree of UV exposure, or automatic switching of streetlights, they have a wide variety of uses including industrial uses such as measuring the quantity of ultraviolet rays in curing processes of plastic, and furthermore, optical uses such as exposure meters.

BACKGROUND ART

As ultraviolet rays can cause skin cancer, it is undesirable to get sunburned heavily. Recently, health equipment (a sunburn alarm) which measures the intensity of ultraviolet rays and notifies the user of the degree of sunburn has appeared on the market. In accordance with the intensity of ultraviolet rays measured with the sunburn alarm, he/she selects the appropriate type of sunscreen or decides to stay indoors on days when ultraviolet rays are extremely strong.

Among the types of existing light sensors are solar batteries and photodiodes. They are a crystalline unit which uses a semiconductor, such as silicon, GaAsP, or GaAs as basic materials. Currently, the unit is manufactured in the form of a thin disk called a "wafer", 20 to 30 cm in diameter, and undergoes such processes as fitting electrodes so as to be a sensor. As the size of one sensor is roughly 1 to 3 $mm^2$, 15,700 sensors of 2 $mm^2$ diameter can be produced from a 20 cm diameter disk. As a fabrication plant considers 25 disks as a lot, the size of one lot is as large as 392,500 units. Therefore, if much smaller quantities are needed, production is difficult and expensive.

Both silicon and GaAs, in pure crystal form, are insulators and do not conduct electricity. They also do not provide a photoelectric response. To enable these elements to provide a photoelectric response as a semiconductor, a lattice defect, or an electron hole, must be generated in the crystalline unit. Therefore, trace amounts of impurities must be added to the silicon or GaAs.

In crystal-based light sensors, the material added to the crystal could be arsenic or gallium, which are not safe. In lower priced light sensors, cadmium sulfide is used as the resistive element; however, cadmium sulfide is toxic and undesirable for widespread use. In addition, cadmium sulfide is only sensitive to specific wavelengths of visible light, and is not capable of having its wavelength sensitivity readily adjusted, thus its usefulness is limited. Further, because the photoelectric effect of crystal-based light sensors converts incoming light into electric current, analog electronic circuits are needed to amplify these minute electric currents, raising them to levels where other circuits can process them. Electricity consumption then becomes problematic and consistent operation becomes difficult in battery driven instruments.

SUMMARY OF THE INVENTION

The objective of the present invention is by simple production techniques, such as used in silkscreen printing, to provide an inexpensive and safe way of producing a light sensing film, which allows greater freedom in selecting light wavelengths. In addition, the present invention provides low power optical meters and detectors (light sensing circuits) by using the light sensing film of the present invention as a capacitor in electronic circuits.

A light sensing film according to claim 1 of the present invention is comprised of a lamination of transparent/translucent material, an upper transparent electrode, a photosensitive dielectric layer including photosensitive dielectric material, a lower dielectric layer, and a lower electrode formed from conductive material such as carbon, a silver coating, a metallic plate, or a conductive coating, wherein: the capacitor is composed of said two electrodes and the dielectric layers; the dielectric constant of the photosensitive dielectric layer between the two electrodes changes when light enters this layer, the capacitance of the capacitor changes accordingly, and thereby light intensity can be detected from this change.

A light sensing film of claim 2 of the present invention is a light sensing film according to claim 1, wherein zinc sulfide is used as the photosensitive dielectric material composing the photosensitive dielectric layer.

A light sensing film of claim 3 of the present invention is a light sensing film according to claim 1, wherein titanium dioxide is used as the photosensitive dielectric material composing the photosensitive dielectric layer.

A light sensing film of claim 4 of the present invention is a light sensing film according to claims 1 to 3, wherein the undersurface of the lower electrode is laminated with protective material.

A light sensing circuit of claim 5 of the present invention is a light sensing circuit wherein: a light sensing film according to any one of claims 1 to 4 is used as a capacitor in a CR or LC oscillator; changes in the capacitance C of the light sensing film are detected by counting the oscillation frequency of said oscillator; and light intensity can be calculated from the counted value.

BEST MODE FOR CARRYING OUT THE INVENTION

Figure 1:
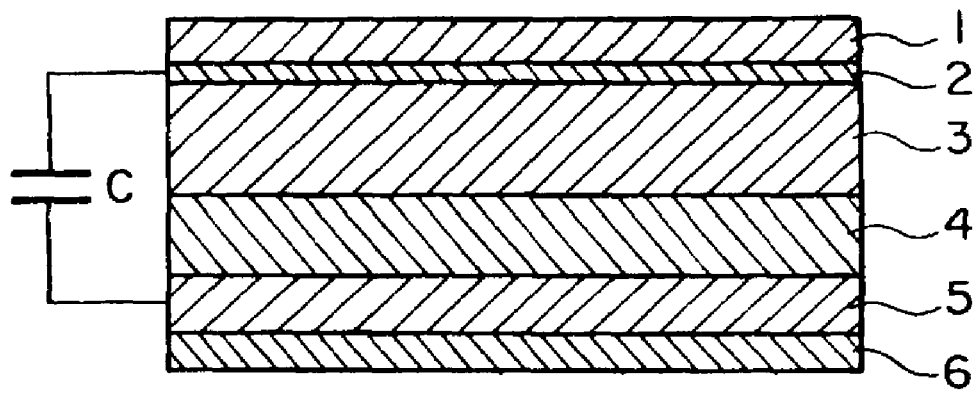
FIG. 1 is an explanatory diagram, displaying an example of a light sensing film of the present invention in form of vertical section.

An example of a light sensing film of the present invention will be explained using FIG. 1 in form of vertical section. This is laminated with the following:

1. Translucent material: transparent plastic film, plate, or glass plate
2. Transparent upper electrode
3. Photosensitive dielectric layer comprised of photosensitive dielectric material
4. Lower dielectric layer for adjusting the capacitance.
5. Conductive lower electrode: formed from carbon, a silver coating, a metallic plate, or a conductive coating.
6. Protective material to protect the lower electrode 5 and the light sensing layer 4 (dielectric layer).

The above-mentioned translucent material 1 is the backing material on which the above-mentioned upper electrode 2 is formed on the interior side by means of printing or evaporation. This translucent material 1 passes light and protects the structure of the capacitor at the light-sensing side. The surface shape and size of the light-sensing film of the present invention are determined by the requirements of the application such as a sunburn alarm, daylight detector or others, without limitation.

In the above-mentioned upper electrode 2, Indium oxide doped with Tin Oxide (ITO) or metallic evaporated membranes may be used. ITO is used as a surface treatment of transparent electronic conductors and a thin membrane is formed with an electron beam or sputtering. A macromolecular compound film, formed by magnetron or other sputtering methods, may also be used.

The photosensitive dielectric layer 3 includes photosensitive dielectric material. By using photoconductive material, common fluorescent material, cadmium sulfide, or zinc sulfide, the electron orbits of the molecules and atoms of the fluorescent or photoconductive material (hereinafter both materials shall be referred to as "photosensitive material") will change according to incident light wavelengths and intensity. This will result in a change in dielectric constant. The photosensitive dielectric layer 3 can be printed or formed by other means under the upper electrode 2. The thickness thereof can be set as needed, for example, it can be set at 20–40 ☐m.

The lower dielectric layer 4 is for adjusting capacitance and barium titanate (barium titanate oxide) may be used, as an example. This can be printed or formed by other means, under the photosensitive dielectric layer 3.

The above-mentioned protective material 6 is a coating or plate to protect lower electrode 5, photosensitive dielectric layer 3, and lower dielectric layer 4. However, this is not always necessary. In addition, if not required to adjust the capacitance of the capacitor, the lower dielectric layer 4 can also be omitted. The protective material 6 can be printed or bonded under lower electrode 5, or formed by other means.

In FIG. 1, the capacitor is comprised of the upper electrode 2, on the upper side of the photosensitive dielectric layer 3, the lower dielectric layer 4, and the lower electrode 5. Capacitance C thereof is generally proportional to the areas of both electrodes 2 and 5, and the dielectric constant factor is the combined dielectric constants of the photosensitive dielectric layer 3 and the lower dielectric layer 4.

In the light sensing film in FIG. 1, light enters through the surface of the translucent material 1 and the upper electrode 2, and reaches the photosensitive dielectric layer 3, changing its dielectric constant. If the light is strong, the light penetrates deep into the photosensitive dielectric layer 3 and the dielectric constant will rise, greatly increasing the capacitance C of the capacitor formed by the upper electrode 2 and the lower electrode 5. By reading the change in capacitance light intensity can be detected. And by adjusting the thickness of the photosensitive dielectric layer 3, sensitivity and the maximum measurable value of light intensity can be adjusted.

The photosensitive dielectric layer 3 can be formed by evaporation with compounds capable of crystallizing such as zinc sulfide. In this case, by omitting the lower dielectric layer 4, and forming the lower electrode 5 by ITO or metallic evaporation, the sensor itself can be made transparent.

Figure 2:
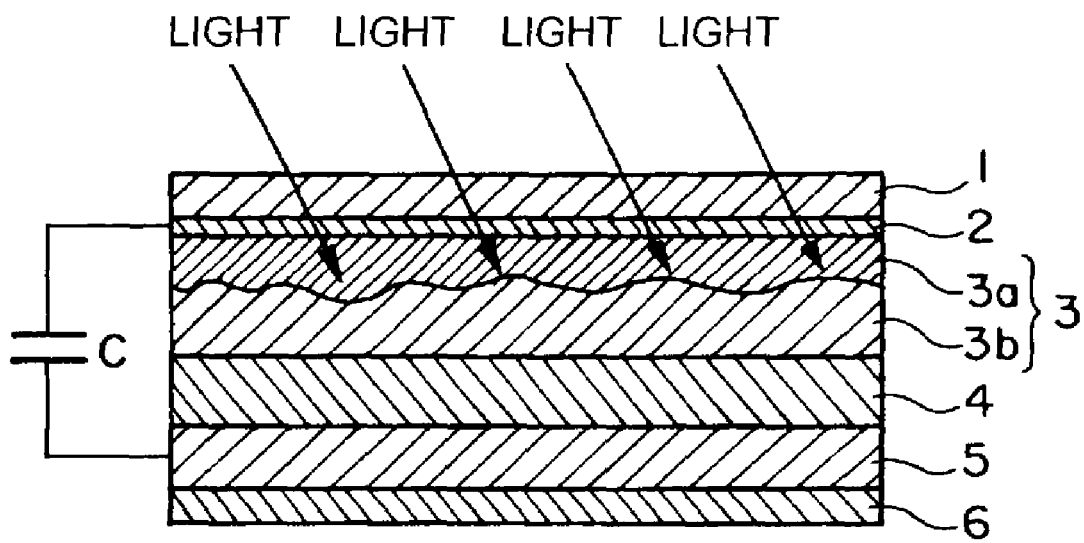
FIG. 2 is an explanatory diagram, displaying light entering the photosensitive material layer of a light sensing film of the present invention in form of vertical section.

FIG. 2 displays light entering the photosensitive dielectric layer 3 of light sensing film of the present invention. In the photosensitive dielectric layer 3 of FIG. 2, the entered light excites section 3A, while section 3B is unexcited as light does not reach (does not enter) it. It is possible to select from a wide variety photosensitive materials for the photosensitive dielectric layer 3. If zinc sulfide as a powder or evaporated membrane is used as the photosensitive material, this light sensor will have sensitivity to light of 350 angstroms, which is the absorption wavelength of zinc sulfide, and there is no sensitivity to visible light. In this manner, varying the photosensitive dielectric material makes selection of wavelength sensitivity possible and measuring a wide spectrum of light wavelengths is feasible.

Incidentally, fluorescent photosensitive materials show sensitivity to both absorptive and emissive wavelengths. For example, if red fluorescent material is used as the photosensitive material, the light sensing film becomes sensitive to red wavelengths. If white (mix of a variety of wavelengths) fluorescent material is used as the photosensitive material, the light sensing film becomes sensitive to general visible light. In traditional photo sensors using semiconductor crystallization technology, the atoms that constitute the crystal determine its three-dimensional structure, therefore if the crystal structure is determined, the light wavelength sensitivity characteristics are determined accordingly; and there is no means for altering spectral sensitivity. Since any printable powder using suitable binder may be the photosensitive material used in the light sensing film of the present invention, multiple photosensitive powders can be mixed or a single substance may be used. By changing the photosensitive material of the photosensitive dielectric layer 3 the light wavelengths to which the material responds can be selected and the degree of freedom in selecting wavelength increases.

As the photosensitive material, titanium dioxide can be used for longer lifetime instead of zinc sulfide.

Figure 3:
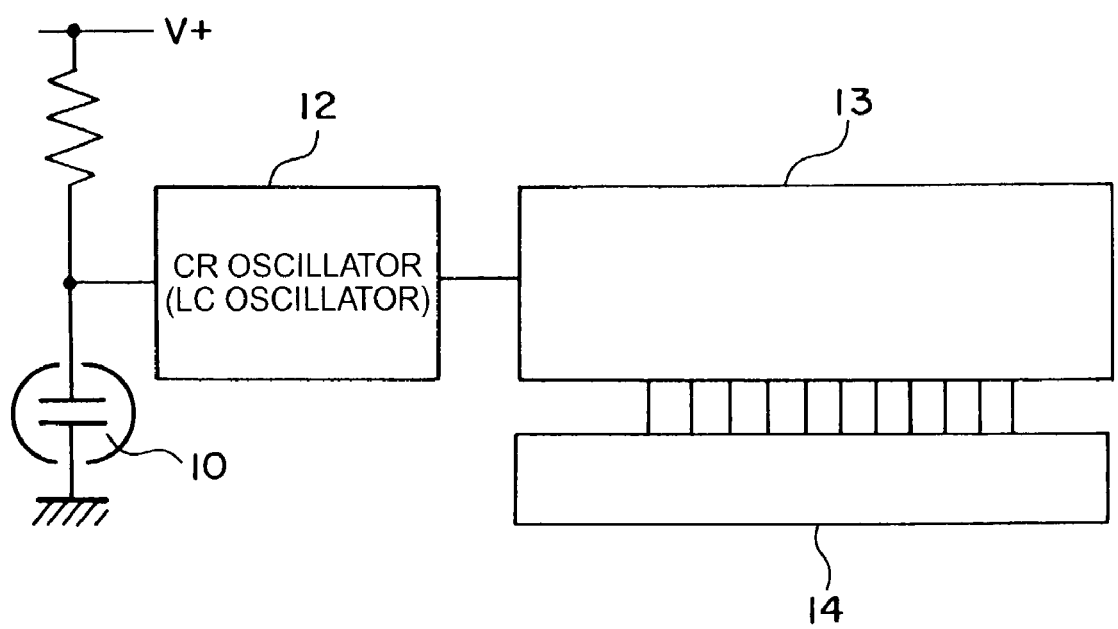
FIG. 3 is an explanatory diagram, displaying an example of the light sensor circuit using a light sensing film of the present invention.

FIG. 3 displays a light sensing circuit using the light sensing film of the present invention. This is one example of means to measure the capacitance of the light sensing film. The electrical circuit element of the light sensor is a capacitor. As it is difficult to read the capacitance value directly, the light sensing film of the present invention's 10 is used, as FIG. 3 shows, as a capacitor for CR or LC oscillator 12. The oscillation frequency of these oscillators 12 is counted with a counter 13 and calculated such that the sensor indirectly detects the capacitance of the capacitor. Light intensity is detected from this capacitance. In this case, the oscillation frequency of the CR oscillator is given by the following formula.

$$f = k \cdot \frac{1}{2\pi\sqrt{CR}}$$

In other words, the oscillation frequency is proportional to the inverse value of root capacitance C of the capacitor. In the light sensor, normally, capacitance C increases and the oscillation frequency decreases with increasing light intensity. The strength of light is distinguishable by the degree of decrease. Furthermore, microcomputer 14 in FIG. 3 is capable of controlling the peripheral frequency counter 13, and sending the values measured by the peripheral frequency counter 13 to external equipment.

An ultraviolet sensor provided by using the light sensing film of the present invention can be used as a sunburn alarm.

Exposure meters, embedded in cameras or stand-alone, measure light intensity and are used to adjust aperture diaphragms. Formerly, exposure meters used cadmium sulfide in their light sensors. If the light sensing film of the present invention is used in the place of this light sensor, and the circuit is configured as in FIG. 3, the exposure meter will measure and display the light intensity. However, the photosensitive material in this case must be chosen to match the light wavelength sensitivity of ordinary silver film, or in a digital camera, the light wavelength sensitivity of a CCD or CMOS sensor. Some ordinary fluorescent materials are suitable for this application.

With an appropriate choice of photosensitive material, the light sensor in FIG. 3 detects sunlight. This can be utilized as an automatic streetlight-switching device. With a decrease in the amount of light (quantity detection), the sensor judges it to be evening and will automatically switch streetlights on. With an increase in the amount of light (light quantity), the sensor judges it to be morning and will automatically switch streetlights off.

The plastic processing industry already has a wide range of uses, such as ultraviolet curing. By exposing soft synthetic resins to ultraviolet rays, the resins can be hardened or softened. Reaction time depends on the intensity of the ultraviolet rays. By measuring the intensity of ultraviolet rays with the light sensing film of the present invention, the optimal processing (reaction) time can be determined according to the measured value.

INDUSTRIAL AVAILABILITY

As the detector of the light sensing film of clams 1 to 4 of the present invention, a wide range of photosensitive dielectric materials can be selected. Since a detector need not be a crystal, a variety of light wavelengths and a wide range of light wavelength can be selected and measured, thus providing more uses for the sensor. Non-toxic organic matter can also be used as the photosensitive dielectric material; therefore, there is a high level of safety. The light sensor is also thin and small.

Since zinc sulfide is used as the photosensitive dielectric material composing the photosensitive dielectric layer in the light sensing film according to claim 2 of the present invention, the light sensing film is suitable as a light sensor exclusively for ultraviolet rays. Also titanium dioxide can be used as the photosensitive dielectric material according to claim 3.

As the light sensing film according to claim 4 of the present invention is the light sensing film described in claims 1 to 3, wherein the undersurface of the lower electrode thereof is laminated with protective material, the lower electrode is protected from damage.

The light sensor circuit of the present invention uses the light sensor film of the present invention as a capacitor for a CR or LC oscillator, changes in the capacitance of the light sensing film capacitor are detected by counting the oscillation frequency of the oscillator, and then light intensity is calculated from these changes. Therefore, the light intensity is detected positively.

The light sensing circuit of the present invention detects changes in light intensity by using the light sensing film as a capacitor for the CR or LC oscillator. Thus, the characteristics of the light sensing film provide a great degree of freedom when selecting wavelengths, an improved level of safety, and small light sensing circuits.

What is claimed is:

1. A light sensing film comprising a transparent/translucent material, an upper transparent electrode, a photosensitive dielectric layer including a photosensitive dielectric material, a lower dielectric layer, and a lower electrode, formed from conductive material, such as carbon, a silver coating, a metallic plate, or a conductive coating, that are laminated together, wherein:
   a capacitor is composed between said upper transparent electrode and said lower electrode;
   as a dielectric constant of the photosensitive dielectric layer between said upper transparent electrode and said lower electrode changes when light enters, capacitance of the capacitor changes;
   and light intensity is detected.

2. A light sensing film according to claim 1, wherein zinc sulfide is used as the photosensitive dielectric material composing the photosensitive dielectric layer.

3. A light sensing film according to claim 2, wherein titanium dioxide is used as the photosensitive dielectric material composing the photosensitive dielectric layer.

4. A light sensing film according to claim 1, wherein an undersurface of the lower electrode is laminated with a protective material.

5. A light sensing circuit wherein:
   a light sensing film according to claim 1 is used as a capacitor for a CR or LC oscillator; change in capacitance C of the capacitor of the light sensing film is detected by counting oscillation frequency of said oscillator; and accordingly light intensity is detected.

6. A light sensing film according to claim 2, wherein an undersurface of the lower electrode is laminated with a protective material.

7. A light sensing film according to claim 3, wherein an undersurface of the lower electrode is laminated with a protective material.

8. A light sensing circuit wherein:
   a light sensing film according to claim 2 is used as a capacitor for a CR or LC oscillator; change in capacitance C of the capacitor of the light sensing film is detected by counting oscillation frequency of said oscillator; and accordingly light intensity is detected.

9. A light sensing circuit wherein:
   a light sensing film according to claim 3 is used as a capacitor for a CR or LC oscillator; change in capacitance C of the capacitor of the light sensing film is detected by counting oscillation frequency of said oscillator; and accordingly light intensity is detected.

10. A light sensing circuit wherein:
   a light sensing film according to claim 4 is used as a capacitor for a CR or LC oscillator; change in capacitance C of the capacitor of the light sensing film is detected by counting oscillation frequency of said oscillator; and accordingly light intensity is detected.

* * * * *